United States Patent [19]

Kissinger, Jr.

[11] 3,859,962

[45] Jan. 14, 1975

[54] SANITARY FLUSHABLE FLOOR FOR CATTLE CONFINEMENT FEEDLOTS

[75] Inventor: Ralph Kissinger, Jr., Fairfield, Nebr.

[73] Assignee: Lennart G. Erickson, San Mateo, Calif. ; a part interest

[22] Filed: Aug. 3, 1973

[21] Appl. No.: 385,621

[52] U.S. Cl. .................................................. 119/28
[51] Int. Cl. ............................................. A01k 01/00
[58] Field of Search .............. 119/28, 20, 16, 27, 15

[56] References Cited
UNITED STATES PATENTS

| | | | |
|---|---|---|---|
| 2,437,210 | 3/1948 | Riebli .................................. | 119/28 |
| 2,642,037 | | Merrill ................................. | 119/27 |
| 2,825,300 | 3/1958 | Carlson ................................ | 119/16 |
| 3,601,096 | 6/1953 | Rutherford .......................... | 119/16 |
| 3,662,715 | 5/1972 | Schapler .............................. | 119/28 |
| 3,762,372 | 10/1973 | Mente et al .......................... | 119/28 |

Primary Examiner—Hugh R. Chamblee
Attorney, Agent, or Firm—Townsend and Townsend

[57] ABSTRACT

An improved feedlot floor and sub-floor construction for use in close confinement feeding of cattle and other farm animals. The floor includes a plurality of inclined solid plane floor surfaces sloping downward to floor slots connecting to sub-floor collector tubes or channels. Animal manure waste products flowing down the floor slopes, by action of gravity and animal movement, pass through the floor slot openings into sub-floor channels or tubes and are subsequently removed by gravity flow and hydraulic flushing action of water flowing therethrough. Floor sections adjacent to the feeding bunkers and watering troughs include relatively level step areas to provide secure footing for cattle while feeding or drinking and an increased angle of inclination of adjacent floor plane surfaces to induce cattle to move away from the feedbunk and watering trough areas when not feeding or drinking.

4 Claims, 5 Drawing Figures

SANITARY FLUSHABLE FLOOR FOR CATTLE CONFINEMENT FEEDLOTS

BACKGROUND OF THE INVENTION

1. Field of the Invention

This invention relates to an improved feedlot floor and sub-floor construction and is especially applicable to the close confinement and pen feeding of farm animals wherein the manure wastes from such animals are collected in sub-floor channels or tubes, subsequently flushed with water to remove such wastes from the feeding area.

2. Description of the Prior Art

The February 1971 Staff Report of the National Industrial Pollution Control Council (U.S. Government Printing Office 1971-431-795/200) on the subject of "Animal Wastes" summarizes the growing problem of pollution of water, soil and air resources created by the waste products of farm animals. A major source of environmental pollution is the excreted waste products of farm animals in feedlots, particularly beef cattle. More specific information has been published in "The Mounting Problem of Cattle Feedlot Pollution," Agricultural Science Review, U.S. Department of Agriculture, Volume 9, No. 1, 1st Quarter 1971.

In recent years, enclosed or semi-enclosed confinement feedlot building structures are increasingly used to shelter the animals from the elements in a more sanitary environment. Operational and feeding costs are usually reduced and animal performance is usually improved as compared to more conventional open feedlots.

Many such confinement feedlot facilities have been described in the literature, for instance: "Progress Report on Confinement Feeding Research," a June 1972 publication at Iowa Beef Processors, Inc. Leading manufacturer-contractors who are specialists in the design and construction of similar confinement feeding facilities are Corral Industries, Inc., Phoenix, Ariz.; Dabco, Inc., La Salle, Colo.; Butler Manufacturing Company, Kansas City, Mo.; and Badger Northland Incorporated, Kaukauna, Wis.

All confinement feedlot structures and facilities heretofore used or supplied by these companies and others, and by individuals and organizations in the agricultural industry generally, have typically employed a construction in which most of the feedlot floor is a level or flat plane area with a multiplicity of parallel spaced slots, typically 1⅝ inches to 2 inches wide, and separated by floor area slats typically 5 inches to 8 inches wide. Under the feedlot floor is a sub-floor area comprising a series of channels, culverts or storage pits of concrete construction and having a total sub-floor area about equivalent to the slotted floor feedlot area above. Usually the floor slats are of reinforced concrete beam construction and must be strong enough to bridge over the sub-floor channels, culverts or pits. These slat-beams must also carry the live load of cattle weighing 800 to 1,200 pounds each, in floor loading averaging about 1,000 pounds animal weight per 18 to 20 square feet of confinement feedlot floor area. Manure accumulations upon the level surface areas of the floor slats are "walked off" by the cattle residents and falls through the floor slots. Manure accumulations in the sub-floor areas are usually removed by cable drawn mechanical scrapers or by suction pumps or by hydraulic flushing.

Due to the above design factor considerations, all confinement feedlots heretofore constructed have been relatively costly to construct, i.e., about double the cost of the more conventional open type feedlots of comparable carrying capacity. Furthermore, the task of manure removal from a sub-floor area about equivalent to the total confinement feedlot floor area has proved to be more costly than anticipated. It has also been noted that cattle prefer to stand and to recline on solid floor areas as compared to slot-and-slat floor areas, apparently for reasons of comfort and freedom from drafts and odors emanating from the floor slots. Apparently for these and other reasons most feedlots constructed in recent years have been of the conventional open lot type although it is well known that such feedlots are less efficient in beef production and have a much greater potential for environmental pollution from odors, runoff during rain periods and seepage pollution of sub-surface waters.

SUMMARY OF THE INVENTION AND OBJECTS

A primary objective of the present invention is to provide a functionally suitable confinement feedlot floor and sub-floor structure substantially less costly than any previously known construction of equal functional utility.

An object of this invention is to provide a confinement feedlot self-cleaning floor surface area most of which is solid and free from slots or other discontinuities and thus better suited to the comfort of the animals resident thereon.

An object of this invention is to provide for inherent movement and concentration of feedlot manure-wastes, deposited on the floor, for discharge into a relatively small area of floor slots.

An object of this invention is to reduce the surface area and volume of sub-floor manure-waste collection and removal construction, relative to feedlot floor construction.

An object of this invention is to reduce air pollution emanating from farm animal feedlots, by substantially reducing the total surface area of exposure to air circulation of manure waste products retained on or in feedlot floor and sub-floor construction areas.

An object of this invention is to substantially reduce the volume and area of sub-floor construction to be cleaned or flushed to accomplish manure-waste removal.

An object of this invention is to provide a sloped floor feedlot surface including a relatively small area of level footing for cattle standing in position to take feed from a feed bunker.

An object of this invention is to provide a sloped floor feedlot surface including a relatively small area of greater slope to induce non-feeding cattle standing adjacent to a bunker feeding area to move away to other areas of the feedlot floor.

An object of this invention is to provide a sloped floor feedlot surface including a relatively small area of level footing for cattle standing in position to take water from a watering trough.

An object of this invention is to provide a sloped floor feedlot surface including a relatively small area of greater slope to induce non-drinking cattle standing adjacent to a watering trough area to move away to other areas of the feedlot.

An object of this invention is to provide an improved feedlot floor construction which may be used alternatively to the flat plane fully slotted floor described in the United States Patent Application of Lennart G. Erickson and William Scott Erickson entitled "APPARATUS AND METHOD FOR HANDLING ANIMAL WASTES," Ser. No. 290,016, filed Sept. 18, 1972, and compatible with the auxiliary ozone and irradiator technology described in combination therewith.

An object of this invention is to provide an improved means for collection of farm animal manure-wastes and for hydraulic removal and transport of same to a storage pond or lagoon by means of flushing with recirculated effluent from such pond or lagoon.

An object of this invention is to provide an improved means for collection of farm animal manure-wastes and for hydraulic removal and transport of same by flushing with added water to create a dilute fluid slurry suitable for recycling distribution to land employing the improved sprinkler irrigation technology described in U.S. Pat. No. 3,703,990 to Lennart G. Erickson and in the United States Patent Application of Lennart G. Erickson and William Scott Erickson outlined "WATER JET PROJECTOR AND CONTROL APPARATUS," Ser. No. 295,763, filed Oct. 6, 1972.

These and other features and objects of the invention will become apparent from the following description when taken in conjunction with the accompanying drawings.

DETAILED DESCRIPTION OF THE PREFERRED EMBODIMENTS

Figure 1:
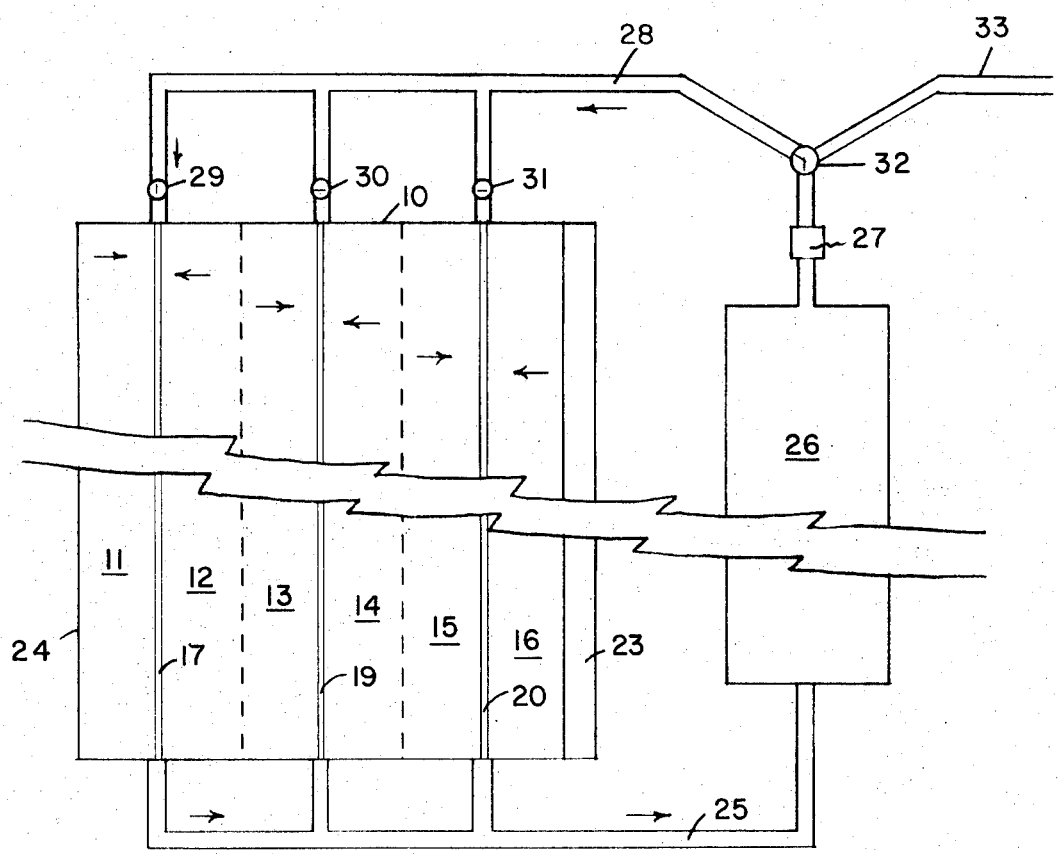
FIG. 1 is a plan view of a feedlot floor including six sloped floor sections draining to three longitudinal floor slots.
Figure 1A:
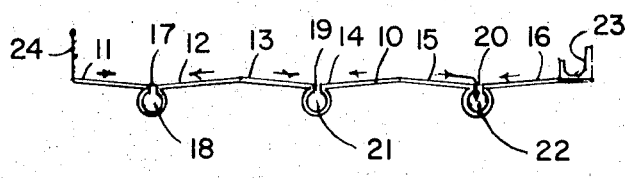
FIG. 1A is a cross section view of the floor of FIG. 1, illustrating the use of circular cross section channels for receiving manure-wastes passing through the slots communicating with the feedlot floor.

Referring to plan view FIG. 1 and cross section view FIG. 1A, there is shown a preferred feedlot floor arrangement in which the animal supporting concrete floor 10 is divided longitudinally into six inclined flat plane surfaces, 11 through 16, each usually about 6 to 8 feet in width. Surfaces 11 and 12 are inclined downwardly toward each other at gradients of about 1 inch vertical to 12 inches horizontal. Both of these surfaces drain in a slot 17 below their lower margins, about 2 inches in width, discharging into a sub-floor conduit or channel 18, usually tubular in shape and 12 inches to 24 inches in diameter. Similarly floor surface pairs 13–14 and 15–16 are inclined to discharge through longitudinal slots 19–20 into related sub-floor channels 21–22.

In cattle feeding applications a feed trough 23 is provided for the animals, usually confined in pen areas bounded by a perimeter fence 24 and cross-floor fences as desired. The overall surface area dimensions of such a feedlot floor are typically 24 to 45 feet in width and 300 to 1,200 feet in length to provide carrying capacities of about 400 to 3,000 head of cattle. Multiple structures may be employed for greater capacities. Waste products excreted per day by an average steer animal of 800 pounds weight is about 1.1 cubic feet (8.2 gallons) of which about 14 percent by weight is relatively high density solid material and the balance is water.

Sub-floor channels 18, 21 and 22 extend longitudinally over the full length of the floor and are installed at a gradient fall of about 3 to 12 inches per 100 feet to facilitate fluid drainage to collector pipe 25 which in turn drains into a lagoon or treatment area 26. Therein bacterial decomposition or other processes well known in the art are employed to reduce most of the waste products to a relatively inert liquid effluent. Effluent liquid through pump 27 is recirculated through pipeline 28 through control valves 29, 30 and 31 through sub-floor channels 18, 21 and 22 in turn, thus to hydraulically flush out of these channels the accumulated deposits of manure-waste material and to convey such manure-wastes to lagoon treatment area 26. Occasionally as necessary, the excess of effluent liquid accumulated in lagoon treatment area 26 is discharged through pump 27, two-way valve 32 and irrigation pipeline 33 to nearby agricultural lands. The manure waste material deposited into sub-floor channels 18, 21 and 22 tends to separate into a semi-solid material fraction, remaining at the bottom of these channels, and a liquid fraction which flows by force of gravity over the surface of the semi-solid material and through collector pipe 25 into lagoon treatment area 26. The accumulating semi-solid manure-waste material is flushed out of channels 18, 21 and 22, usually daily. The recirculated flow of effluent flushing liquid tends to flow initially over the surface of the semi-solid manure chemical material to the low point discharge end of the deposition accumulated in each channel. Starting at this point, the hydraulic waterfall effect of fluid flow effectively erodes the deposit of semi-solid manure-waste material progressively upstream until the channel is completely flushed clean. A fluid flow typically 200–350 gallons per minute is used for hydraulic flushing cleanout of each conduit. Time required is typically ½ to 2 hours and varies proportionately to the length of the channels.

Optimum fluid flow rate for such flushing action may be secured by appropriate control adjustment of pump 27 and valves 29, 30 and 31. The optimum effective and efficient cattle carrying capacity of the confinement feedlot floor of FIG. 1–1A, is about 1,000 pounds of animal weight per 18 to 20 square feet of floor space or about 60 average 800 pound weight animals per 1,000 square feet of floor space. At floor loadings in this range, the floor surface will remain moist from depositions of animal manure, urine and fecal waste materials. The liquid fraction will drain readily by gravity flow into the nearest floor slot. The solid or semi-solid fraction will also tend to move by force of gravity but primarily will be displaced and moved toward and into the nearest floor slot by the foot traffic action of cattle moving about the floor. Each step taken by cattle walking on such an inclined floor slope results in an initial contact downhill sliding motion of one-fourth to one-half inch or so. The cattle soon become accustomed to this and the resultant repetitive minor sliding actions are effective in maintaining the feedlot floor surface relatively clean of manure-waste deposits. A floor slope inclination of 1 inch vertical to 12 inches horizontal has been found to be effective as regards self cleaning. Free choice animal performance observations indicate that the resultant stress imposed upon the animals is less than that imposed upon animals resident upon feedlot floors which are a level and continuous area of closely spaced alternate series of slots and slats.

I have found that floorplane slopes of 1 inch vertical rise to 12 inches of horizontal dimension will provide adequate self-cleaning floor action. Lesser floor plane slopes, down to about ½ inch vertical rise per 12 inches horizontal dimension, have been found to be reasonably effective as to the self-cleaning action and greater floor plane slopes, up to about 1¾ inches to 12 inches, have been found to be tolerated by cattle without apparent effect upon their well being or weight gain performance.

Alternative cross section arrangements for feedlot floors as illustrated in FIGS. 1–1A could include a lesser or greater number of sub-floor channels with related slots and pairs of inclined floor panels.

Figure 2:
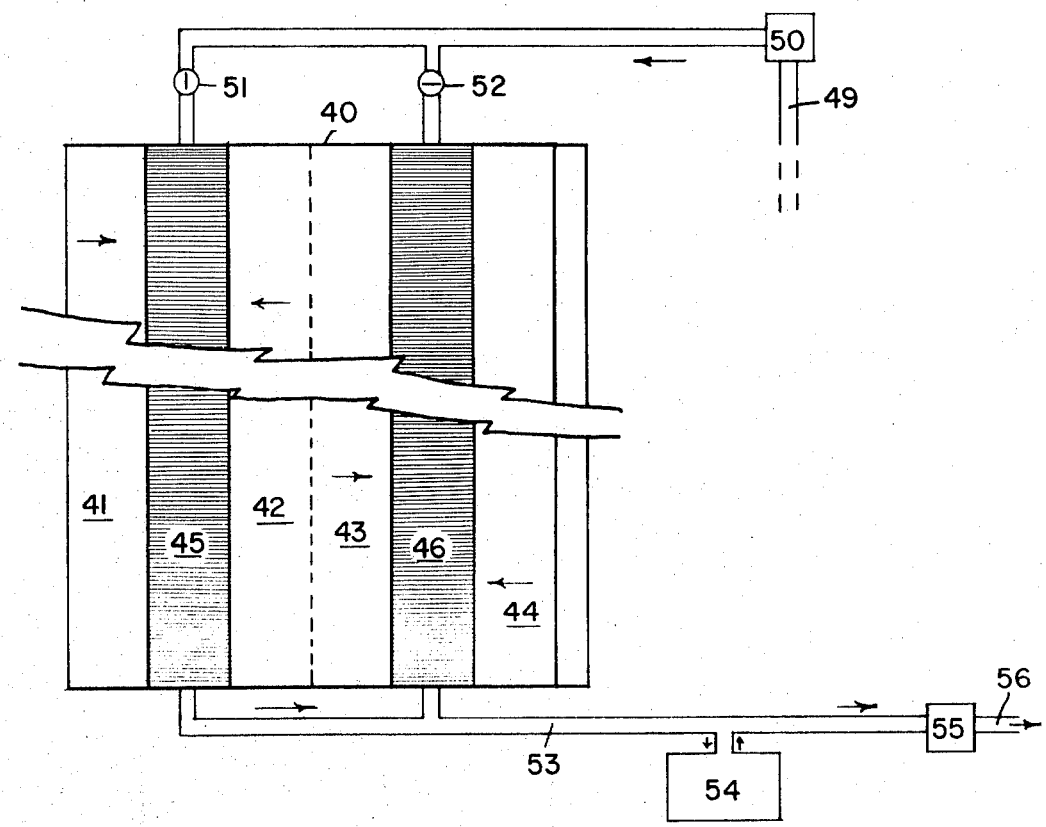
FIG. 2 is a plan view of a feedlot floor including four sloped floor sections draining to relatively smaller longitudinal floor areas of alternate slot and slat construction.
Figure 2A:
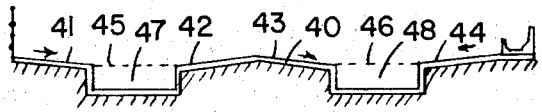
FIG. 2A is a cross section view of the floor of FIG. 2, illustrating two sub-floor longitudinal rectangular cross section channels for receiving manure-wastes passing through the slots communicating with the feedlot floor.

Referring to plan view FIG. 2 and cross section view FIG. 2A, there is shown an alternative feedlot floor arrangement which I constructed and tested successfully in the process of development and refinement of my invention. The "Slope-Slot-Flush" concept and principles of operation of the arrangements of FIG. 1–1A and FIG 2–2A are the same and differ primarily as regards construction of the longitudinal floor drainage slots and channels.

In the arrangement of FIG. 2–2A, the animal supporting concrete floor 40 is divided longitudinally into four inclined flat plane surfaces, 41 through 44, and two level slotted floor surfaces 45 and 46. Typically the slotted floor surfaces 45 and 46 may include a succession of alternate 1¾ inches cross slots and 6 to 8 inch slat floor sections. Alternatively any other pattern of drainage openings such as a crosshatch rectangular grill or a pattern of round holes may be used to accomplish functionally the same purpose as floor discharge slots 17, 19 and 20 of FIG. 1. FIG. 2A illustrates two rectangular sub-floor channels 47 and 48 arranged beneath the slotted floor sections 45 and 46 to receive the manure-waste material flowing therethrough. These channels function as to retention of manure-waste semi-solids and drainage of liquids essentially as described in regard to channels 18, 21 and 22 of FIG. 1–1A. In this illustration 2–2A, water from a well or reservoir is supplied via pipe 49 through pump 50 and control valves 51 and 52 to accomplish a flushing action essentially as described in regard to FIG. 1–1A. Collector pipe 53 drains to a surge reservoir 54 in which gravity flow of the manure-waste liquid fraction accumulates by interim gravity flow and is recombined with the manure-waste solid fraction plus water added during flushing operations.

Surge reservoir 54 is subsequently discharged through pump 55 and pressure pipeline 56 to suitable sprinkler irrigator equipment such as described in U.S. Pat. No. 3,703,990 issued to Lennart G. Erickson or as described in a U.S. Pat. application Ser. No. 295,763, filed Oct. 6, 1972, entitled "WATER JET PROJECTOR AND CONTROL APPARATUS," filed by Lennart G. Erickson and William Scott Erickson.

Figure 3:
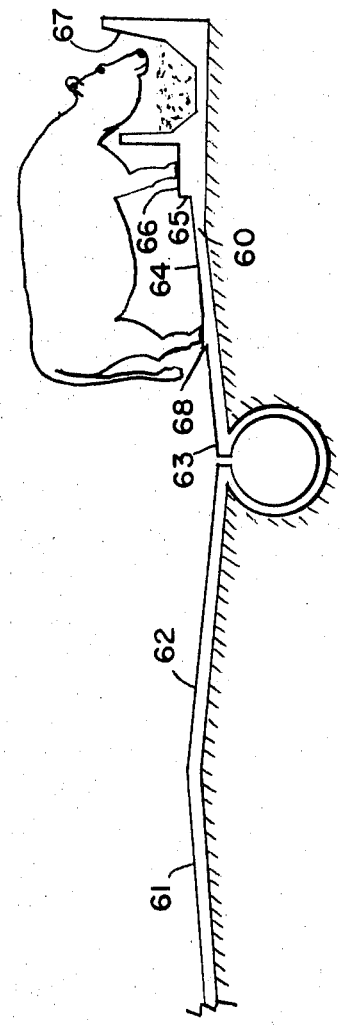
FIG. 3 is a cross section view of part of a floor similar to that of FIG. 1 and with a floor area adjacent to a feed bunker, modified to include a relatively steeper floor plane within which are two relatively level step or strip areas to accommodate the standing position of cattle feeding from the bunker.

FIG. 3 is a section of a feedlot floor 60 including improvements that may be alternatively incorporated into a feedlot floor 10 as illustrated in FIG. 1–1A. Floor panel surfaces 61 and 62 are inclined at gradients of about 1 inch vertical to 12 inches horizontal similar to floor surfaces 15 and 16 of FIG. 1–1A. Floor plane sections 63 and 64 are inclined at a slightly steeper gradient of about 1¼ inches vertical to 12 inches horizontal leading to a level step platform with approximately 4 inches rise 65 and 15 inches horizontal surface 66 parallel to and immediately in front of feed bunker 67.

I have observed that cattle are very discriminating as between any options or choices available to them as regards their environment, physical comforts or stress. In particular their actions may be influenced by seemingly minor changes in feedlot floor construction, for instance they will prefer to stand on the relatively lesser inclined floorplane areas 61 and 62 and will move away from the somewhat more steeply inclined floorplane areas 63 and 64. On the other hand they will stand comfortably and securely while eating from feed trough 67 as their front feet are upon the level step surface 66. Additional stability of stance may be provided by means of an optional level area 68 providing a relatively small foothold accommodating the rear feet of the feeding cattle.

Thus through appropriate small variations in the floor slope gradients of different areas of the feedlot floor of my invention a low cost and effective means is provided to favorably influence the cattle toward increased feed consumption and, after eating, to move away so to make floor space available to encourage other animals to approach the feed trough area. The same principles can be used in construction of floor surface areas surrounding the watering trough usually incorporated in each pen area.

An important characteristic of the feedlot floor construction of my invention is that the total area of sub-floor construction required is small relative to the total feedlot floor surface area when compared to prior art feedlot designs. Construction costs are proportionately lower than for previously known level plane allover slotted floor constructions bridged over a very large sub-floor construction area. The present design can be more efficiently and quickly flushed with lesser amounts of water because of the new sub-floor channel arrangement. Of importance from an environmental standpoint, the present invention sharply reduces the total surface area upon which manure waste products are exposed to air circulation thereby reducing air pollution. For example, the prior art level plane allover slotted floor constructions referred to above generally have sub-floor surfaces upon which manure collects and is exposed to air equal to about 260–280 percent of the surface area of the related floor area upon which the cattle are directly supported. In these calculations, sub-floor surfaces are taken to include the sides and bottoms of the slats as well as all other air-exposed surfaces therebelow. The floor area upon which the cattle live and are directly supported is taken to include the top surface of the slats as well as the coplanar area of the slats.

In distinction, the present invention reduces the sub-floor air-exposed surface area so that it is generally not significantly greater than the cattle floor area. For example, in the embodiment of FIG. 2 of this invention, the sub-floor surfaces are about 102 percent of the overall floor area upon which the cattle live and move about. In the preferred embodiment of FIG. 1 the air-exposed sub-floor surfaces are only about 25–50 percent of this cattle floor area.

Thus according to the teachings of my invention a more efficient and lower cost farm animal confinement feeding facility is provided and which is inherently self cleaning, relatively sanitary and particularly adapted to hydraulic flushing as a relatively low cost and sanitary means for manure-waste removal and management.

While I have described and illustrated some specific embodiments of my invention, it will be clear that variations of the details of construction which are specifically illustrated and described may be resorted to without departing from the free spirit and scope of the invention as defined in the appended claims.

What I claim is:

1. An improved confinement feedlot adapted for inducing preselected movement patterns of cattle therein and efficient removal of manure wastes therefrom comprising: a plurality of solid, flat, inclined cattle supporting surfaces, a subfloor structure including channels for receiving wastes from said inclined surfaces, openings between lower ends of said inclined surfaces for communication with said channels, a feed or water trough positioned adjacent a section of said solid, flat inclined supporting surfaces and in communication with one of said channels of the subfloor structure, the slope of incline of said section adjacent said trough being greater than the slope of incline of the remaining sections of said inclined surfaces, and level step surfaces for at least the front feet of cattle while in position for removing food from said feed trough.

2. An improved confinement feedlot in accordance with claim 1 wherein said feedlot includes level step surfaces for both the front and rear feet of cattle while in position for removing feed from said feed trough.

3. In combination, a feedlot designed for disposal of liquid and solid animal wastes having a floor formed with a plurality of pairs of inclined solid, flat cattle supporting surfaces, the surfaces of the members of each pair being inclined downwardly away from each other, a tubular channel under each pair of supporting surfaces communicating with the surfaces through a relatively narrow slot, pump means connected for flowing water through said channels to hydraulically flush animal wastes therefrom, a feed or water trough positioned adjacent an inclined solid, supporting surface of said floor providing access for animals to said trough, the slope of said trough access surface being greater than the slope of the surfaces of said pairs of inclined surfaces, level surfaces adjacent said trough for the front feet of said animals when in feeding position at said trough and level areas on said trough access surface for the rear feet of animals when in the feeding position at said trough.

4. The combination in accordance with claim 3 wherein the slope of incline of said pairs of inclined surfaces is about ½ inch to 1¼ inches vertical to 12 inches horizontal.

* * * * *